(12) United States Patent
Mielke et al.

(10) Patent No.: US 10,343,473 B2
(45) Date of Patent: Jul. 9, 2019

(54) SPRING LINK MADE OF STEEL

(71) Applicant: Benteler Automobiltechnik GmbH, Paderborn (DE)

(72) Inventors: Oliver Mielke, Altenbeken (DE); Detlev Peitz, Paderborn (DE); Hauke Mehner, Paderborn (DE); Tobias Ebbing, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 22 days.

(21) Appl. No.: 15/406,621

(22) Filed: Jan. 13, 2017

(65) Prior Publication Data
US 2017/0203624 A1  Jul. 20, 2017

(30) Foreign Application Priority Data
Jan. 15, 2016 (DE) .................. 10 2016 100 666

(51) Int. Cl.
*B60G 7/00* (2006.01)
*B60G 7/02* (2006.01)

(52) U.S. Cl.
CPC ............ *B60G 7/001* (2013.01); *B60G 7/008* (2013.01); *B60G 7/02* (2013.01); *B60G 2204/1244* (2013.01); *B60G 2206/017* (2013.01); *B60G 2206/0122* (2013.01); *B60G 2206/11* (2013.01); *B60G 2206/122* (2013.01); (Continued)

(58) Field of Classification Search
CPC .......... B60G 7/001; B60G 7/008; B60G 7/02; B60G 2204/1244; B60G 2206/0122; B60G 2206/11; B60G 2206/162; B60G 2206/72; B60G 2206/017; B60G 2206/122;
(Continued)

(56) References Cited

U.S. PATENT DOCUMENTS 3,797,852 A * 3/1974 Patterson ................. B60G 3/06
267/221
7,387,307 B2 * 6/2008 Tanaka .................... B60G 3/202
280/124.135

(Continued)

FOREIGN PATENT DOCUMENTS

DE 102004003151 A1 8/2005
DE 102006014730 A1 10/2007
(Continued)

OTHER PUBLICATIONS

European Office Action, No. 16 205 830.9, dated Jan. 4, 2018, 16 pp.
(Continued)

*Primary Examiner* — Laura Freedman
(74) *Attorney, Agent, or Firm* — Hauptman Ham, LLP (57) ABSTRACT

The present invention relates to a spring link for a motor vehicle, wherein the spring link is produced as an elongated, deformed hollow profile of open cross section made of a steel material and has respective attachment points at its ends, said spring link being characterized in that the spring link, in the installed position, is arranged with its opening of the hollow profile pointing upward, wherein a spring seat plate for receiving a helical compression spring is coupled to the spring link on and/or partially in the opening.

16 Claims, 6 Drawing Sheets

(52) U.S. Cl.
 CPC .... *B60G 2206/162* (2013.01); *B60G 2206/72* (2013.01); *B60G 2206/8201* (2013.01); *B60G 2206/84* (2013.01); *B60Y 2410/124* (2013.01)

(58) Field of Classification Search
 CPC ........ B60G 2206/8201; B60G 2206/84; B60Y 2410/124
 See application file for complete search history.

(56) References Cited

U.S. PATENT DOCUMENTS

| | | | | |
|---|---|---|---|---|
| 7,959,171 | B2* | 6/2011 | Takahashi | B60G 7/001 267/179 |
| 8,690,176 | B2* | 4/2014 | Perry | B21D 53/88 280/124.134 |
| 8,936,264 | B2* | 1/2015 | Koormann | B60G 7/001 280/124.151 |
| 9,126,468 | B2* | 9/2015 | Uemori | B60G 11/16 |
| 9,233,587 | B2* | 1/2016 | Korte | B21D 53/90 |
| 9,895,947 | B2* | 2/2018 | Meyer | B60G 7/001 |
| 2006/0175788 | A1 | 8/2006 | Nuno et al. | |
| 2009/0072506 | A1 | 3/2009 | Jang et al. | |
| 2015/0008654 | A1 | 1/2015 | Haselhorst et al. | |
| 2015/0115561 | A1 | 4/2015 | Nakasato et al. | |

FOREIGN PATENT DOCUMENTS

| | | |
|---|---|---|
| DE | 102006032595 A1 | 1/2008 |
| DE | 102008047015 A1 | 7/2009 |
| DE | 102008013182 A1 | 9/2009 |
| DE | 102009042403 A1 | 3/2011 |
| DE | 102011053927 A1 | 3/2013 |
| DE | 10 2012 100 719 A1 | 8/2013 |
| DE | 10 2013 222 234 A1 | 4/2015 |
| EP | 1642754 A1 | 4/2006 |
| JP | 2002316228 A | 10/2002 |

OTHER PUBLICATIONS

European Search Report in EP 16 20 5830 dated Feb. 21, 2017, 9 pages.

* cited by examiner

SPRING LINK MADE OF STEEL

RELATED APPLICATIONS

The present application claims priority from German Application No. 10 2016 100 666.1, filed Jan. 15, 2016, the disclosure of which is hereby incorporated by reference herein in its entirety.

BACKGROUND

The present invention relates to a spring link for a motor vehicle.

Individual wheel suspensions of motor vehicles are known from the prior art. To this end, there are multi-link axles, in which links are coupled at one end rotatably or pivotably on a motor vehicle body and are coupled with the opposing end of the link rotatably or pivotably on a wheel carrier.

A for the most part lower link of a motor vehicle axle additionally comprises a receptacle for a spring and optionally furthermore a receptacle for a damper and/or motor vehicle stabilizer. The forces which arise during the spring compression or rebound of the motor vehicle wheel are therefore absorbed via the spring.

A corresponding spring link is in this respect, however, for the most part an elongated narrow component. A spring, by contrast, is configured as a helical compression spring and has a diameter greater than the width of the spring link itself. Spring links therefore for the most part have a widened configuration in the region of the spring receptacle. During the spring compression or rebound, however, this has the effect that forces are introduced into the spring link in such a manner that the spring link widens or contracts minimally. This effect is also referred to as breathing.

The spring link itself has conflicting goals here; that of having a particularly flexurally rigid configuration but at the same time having a low component weight such that a low weight is present particularly on sides of the unsprung wheel masses, with the result that a high level of driving dynamics of the motor vehicle is made possible.

DE 10 2012 100 719 A1 or else DE 10 2013 222 234 A1 disclose spring links which are produced as deformed sheet steel components. However, these also have a widened cross section in the region of the spring receptacle.

It is therefore an object of the present invention to specify, proceeding from the prior art, a spring link which is produced as a steel component and has a low dead weight combined with a high rigidity.

SUMMARY

The aforementioned object is achieved by a spring link as per the features in one or more embodiments described herein.

The spring link for a motor vehicle is produced as an elongated, deformed hollow profile of open cross section made of a steel material and has respective attachment points at its ends. In particular, the spring link is produced as a deformed sheet-metal component from a sheet steel blank. Said spring link is characterized in that the spring link, in the installed position, is arranged with its opening of the hollow profile pointing upward, wherein a spring seat plate for receiving a helical compression spring is coupled to the spring link on or in the opening. The invention therefore also relates to an axle arrangement in which the spring link according to the invention is incorporated.

According to the invention, the spring link itself is therefore in the form of an open or partially open hollow profile. In particular, said hollow profile has a U-shaped, C-shaped or hat-shaped progression in cross section. In the installed position of the spring link, the opening of the hollow profile points upward with respect to the vertical direction.

According to the invention, a spring seat plate is now arranged on the opening or partially in the opening and coupled to the spring link. This coupling can be effected, for example, by a thermal joining method, for example welding. The spring link itself can also be produced as an at least partially, in particular completely, quenched and tempered component. The spring link can also be produced by means of hot forming and press hardening.

The spring is formed in particular as a helical compression spring, wherein part of the helical compression spring rests with its winding, in particular with its final winding, on a spring supporting surface of the spring seat plate. The final winding of the helical compression spring, and thus the entire helical compression spring, is therefore arranged above the spring link. On account of the top-side arrangement, it is not necessary for the spring link to be widened. The cross-sectional profile is therefore distinguished by the fact that it is approximately constant or tapers or reduces over the progression, thus in the longitudinal direction. The cross section is not, however, widened. The effect of breathing is thereby avoided in particular, with the result that the force flow within the spring link is improved.

In particular, the cross section of the spring link is embodied in such a manner that the spring link comprises a web and legs protruding from the web. In the installed position, the web extends in particular oriented in the horizontal direction and the legs extend oriented in the vertical direction. The spacing between the legs in the region of the spring seat plate is smaller than or equal to 1.2 times the spacing between the legs in the region of an end or an attachment point. In a preferred embodiment variant, the spacing between the legs in the region of the spring seat plate is smaller than or equal to the spacing between the legs in the region of the end or the attachment point. The spring link is therefore not widened in particular in the region of the spring seat. It is also possible for the spacing between the legs to be relative to the diameter of the helical compression spring or a receiving diameter. In the case of the receiving diameter, the latter is accordingly a diameter for receiving the helical compression spring on the spring seat plate. In particular, the last winding of the helical compression spring is received by the receiving diameter on the spring seat plate.

In these cases, the spacing between the legs in the region of the spring seat plate, in particular the greatest spacing between the legs which arises in the region of the spring seat plate, corresponds in particular to 0.5 times to 1.2 times, in particular 0.8 times to 1.1 times, the diameter of the helical compression spring or the receiving diameter.

The legs themselves do not have to run completely in the vertical direction here, but instead can also be arranged running obliquely at an acute angle to the vertical direction. In particular, the spacing between the legs increases in the direction toward the opening of the hollow profile. Therefore, the legs are arranged in particular running in a V shape in relation to one another.

Furthermore, the hollow profile particularly preferably comprises laterally protruding flanges in the region of the spring seat plate. As a result, the supporting surface and/or coupling surface of hollow profile and spring seat plate is increased.

It is furthermore preferable that collars are formed in particular on the legs or flanges. The collars are preferably bent downward with respect to the vertical direction. The rigidity, in particular the resistance to sagging in the vertical direction of the spring link according to the invention, is thereby increased once again.

It is furthermore particularly preferable that the hollow profile is formed in its longitudinal direction such that at least lengthwise portions run toward one another in a trapezoidal manner. In particular, the hollow profile tapers toward an end, and therefore the spacing between the legs is reduced.

By way of example, the attachment points are embodied as bearing eyes for receiving rubber/metal bearings. However, they can also be embodied as through-openings or boreholes, such that a pivot pin or a different type of joint and/or ball joint can be coupled to the spring link.

The spring link can also be referred to as a transverse link or guide rod.

It is furthermore preferable that a straight connecting line through the attachment points, in particular through the center point of the attachment points, forms a line of action. The hollow profile has an arched progression in relation to the line of action. In particular, in the installed position, the arched progression is oriented in the direction below the line of action. Furthermore, the arched progression is preferably embodied in such a manner that the spring seat plate lies with a spring supporting surface below the line of action. The force flow within the spring link can be optimized thereby, too, such that in particular the active forces during the deflection operation are guided more effectively into the attachment points and the above-described breathing effect is reduced.

To produce the spring link, it is the case in particular that a sheet steel blank is deformed and/or beveled or machined by some other shaping process. Various measures for providing protection against corrosion likewise form part of the invention. By way of example, a pre-coated blank can be machined. The spring link produced can also be coated in a KTL process, however.

In particular, sheet metal thicknesses of 1.8 mm to 4.75 mm are processed, with a wall thickness of the spring seat plate being greater than or equal to, in particular greater than, the wall thickness of the hollow profile itself. Therefore, for example, the hollow profile can be formed from a metal sheet having a wall thickness of 1.8 mm, and the spring seat plate can be formed from a metal sheet having a wall thickness of 2.3 mm.

The spring seat plate itself has to be formed from a metal sheet which is thicker and therefore has greater resistance to bending. On account of its geometrical shape, the hollow profile itself may already have a high moment of resistance to sagging in the installed position, particularly with respect to the vertical direction. As a whole, it is therefore possible to provide a spring link which has a low component weight combined with a high moment of resistance to bending.

It is furthermore preferable that a reinforcement plate is coupled in and/or on the opening of the hollow profile at least in lengthwise portions in the longitudinal direction of the spring link. It is preferable that a plurality of reinforcement plates are arranged in the spring link. The spring link can therefore be optimized depending on the demand for rigidity.

It is furthermore particularly preferable that the spring seat plate comprises a bead oriented upward with respect to a spring supporting surface in relation to the installed position, such that the bead engages into the helical compression spring and here in particular into the winding on the inner side. The bead avoids a situation where the helical compression spring slides down horizontally. In particular, the winding furthermore lies partially directly above the legs with respect to the vertical direction of a vertical line of force. The spring forces which arise in particular during the deflection operation can therefore be diverted directly into an optimized force flow within the spring link.

BRIEF DESCRIPTION OF THE DRAWINGS

Further advantages, features, properties and aspects of the present invention are the subject of the description hereinbelow. Preferred embodiment variants are shown in the schematic figures. These serve for a simple understanding of the invention.

In the figures, the same reference signs are used for identical or similar components, even if a repeated description is avoided for reasons of simplicity.

DETAILED DESCRIPTION

Figure 1:
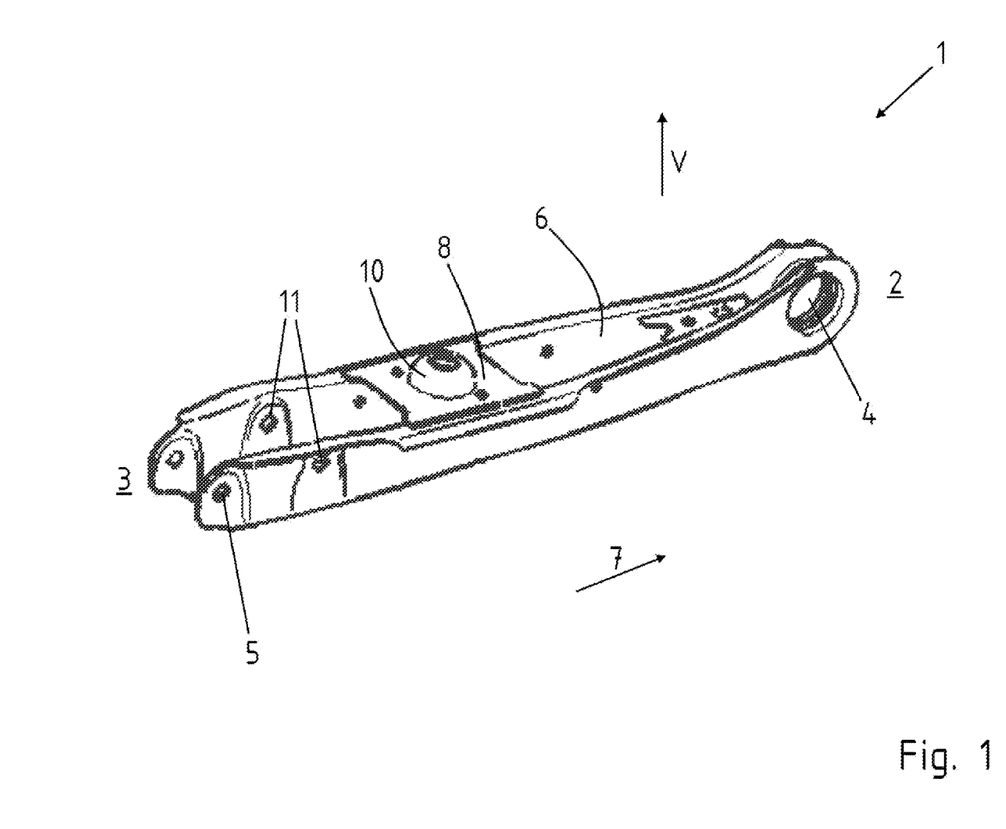
FIG. 1 shows the spring link according to the invention in a perspective view.

FIG. 1 shows the spring link 1 according to the invention in a perspective view. Said spring link is in the form of an elongated deformed sheet-metal component and has attachment points 4, 5 at its respective ends 2, 3, such that it can be fastened rotatably at one end 3 to a vehicle body (not shown in greater detail) and at the opposing end 2 to a wheel carrier (not shown in greater detail) or some other type of axle component. The spring link 1 can also be fastened to an axle subframe. To this end, use is made either of bolts or else of rubber/metal bearings or other mounting systems. These are not shown in greater detail for reasons of simplicity, however.

According to the invention, the spring link 1 is in the form of an open hollow profile in cross section and has an opening 6, the opening 6 pointing upward with respect to the vertical direction V in the installed position. A spring seat plate 8 is arranged in portions on the opening 6 in the longitudinal direction 7 of the spring link 1. The spring seat plate 8 comprises a spring supporting surface 9 and also a bead 10 extending upward with respect to the vertical direction V. Furthermore, a receptacle 11 is provided for coupling a damper (not shown in greater detail).

Figure 2:
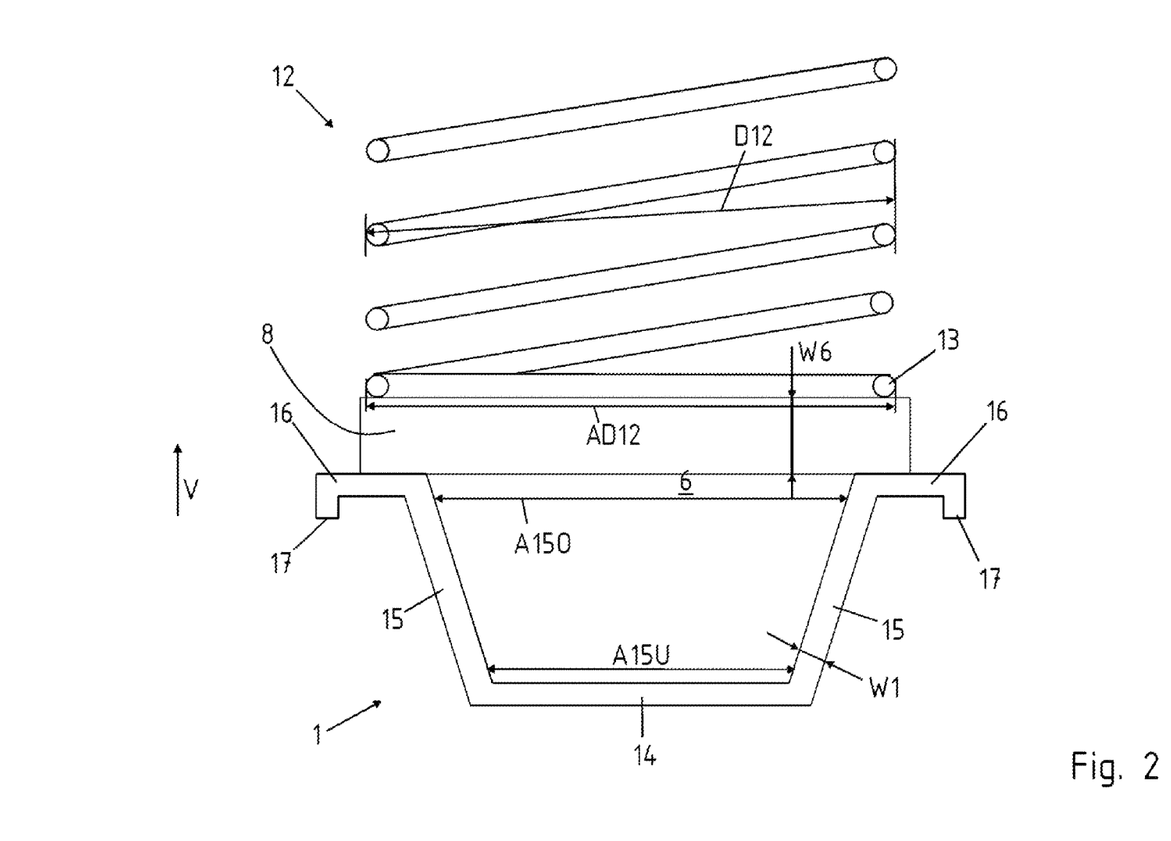
FIG. 2 shows a schematic cross-sectional view with a helical compression spring in the region of the spring seat plate.

It can be seen readily in FIG. 2, which shows a cross-sectional view in the region of the spring seat plate 8 with a helical compression spring 12, that the spring link 1 is in the form of a hollow profile in cross section. The bead 10 is not shown. An opening 6 located at the top with respect to the vertical direction V is closed off by the spring seat plate 8. The hollow profile comprises a web 14 and also legs 15 extending laterally from the web 14 oriented in the vertical direction V. Laterally protruding flanges 16 are arranged at the end of the legs 15, and in turn a collar 17 bent downward with respect to the vertical direction is formed at the end of each of the flanges 16.

The wall thickness W6 of the spring seat plate 8 is greater than the wall thickness W1 of the hollow profile. The helical compression spring 12 itself is arranged with its final winding 13 in such a manner that the latter is arranged above the legs 15 with respect to the vertical direction V. A force introduced into the spring link 1 by the helical compression spring 12 is thus introduced directly into the legs 15 via the spring seat plate 8.

The greatest spacing A15O between the legs 15 preferably corresponds here to 0.5 to 1.2 times, in particular 0.8 to 1.1 times, the diameter D12 of the helical compression spring 12 or a receiving diameter AD12. The invention therefore also relates to an arrangement on a motor vehicle axle with a helical compression spring 12 and a spring link 1. A receiving diameter AD12 is preferably formed on the spring seat plate 8. This receiving diameter AD12 is suitable in particular for correspondingly receiving the last winding 13 of the helical compression spring 12.

It can furthermore be seen that the legs are arranged in a V shape in relation to one another, such as to give rise to, with respect to the vertical direction, to a bottom spacing A15U, this increasing in the direction toward the opening 6 to the top spacing A15O.

Figure 5:
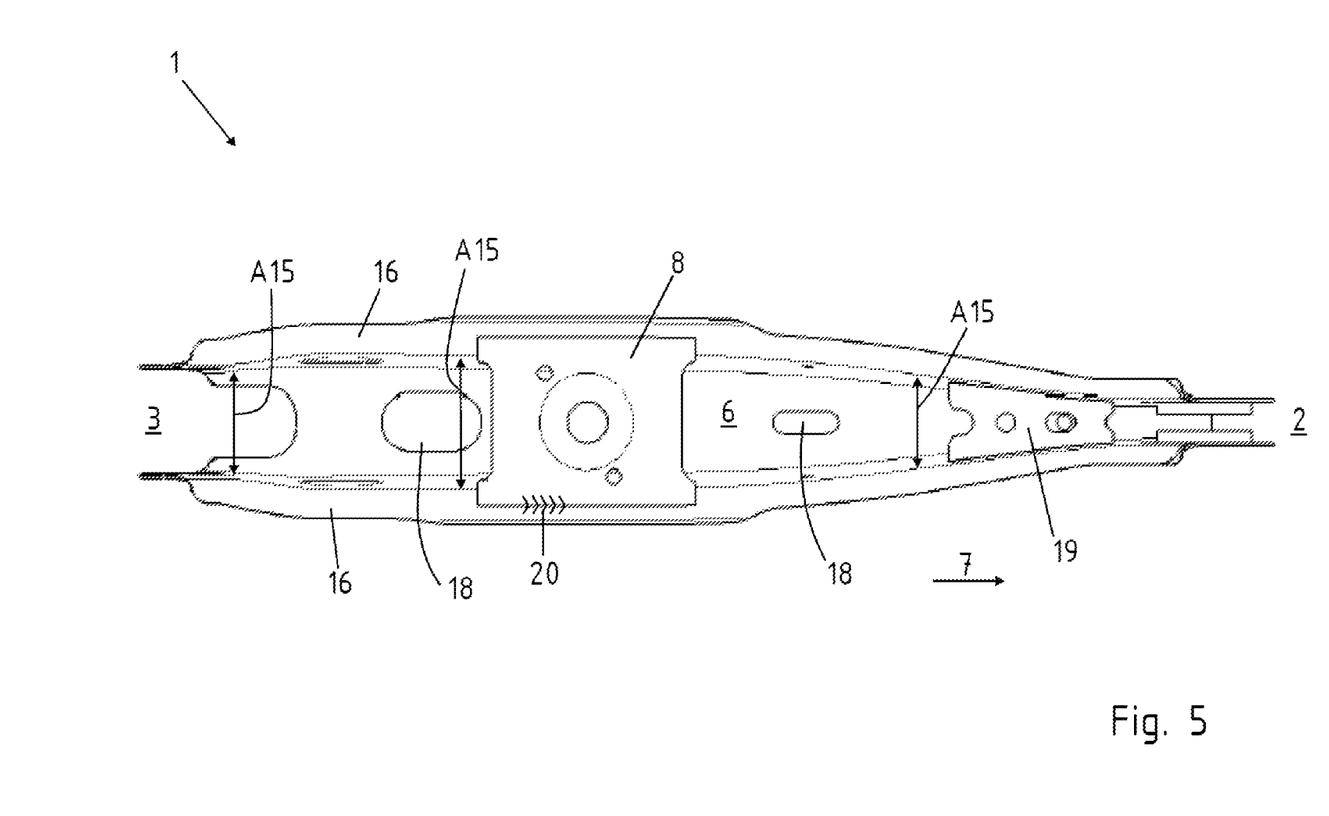
FIG. 5 shows a plan view onto the spring link according to the invention.

It can be seen readily in the plan view shown in FIG. 5 that the spacing A15 between the legs 15 in the region of the spring seat plate 8 corresponds substantially to the spacing A15 between the legs 15 in the region of the end 3. In particular, the spacing A15 in the region of the spring seat plate 8 is at most 1.2 times greater than the spacing A15 between the legs 15 in the region of the end 3. The spacing A15 between the legs 15 decreases toward the other end 2, such that the spring link 1 is formed in a trapezoidal manner in portions in its longitudinal direction 7, or the legs 15 are oriented so as to taper toward one another. Furthermore, cutouts 18 are provided for reducing the weight and/or so that spray water does not accumulate in the interior of the hollow profile such that corrosion would thereby be promoted on account of standing water.

Figure 3:
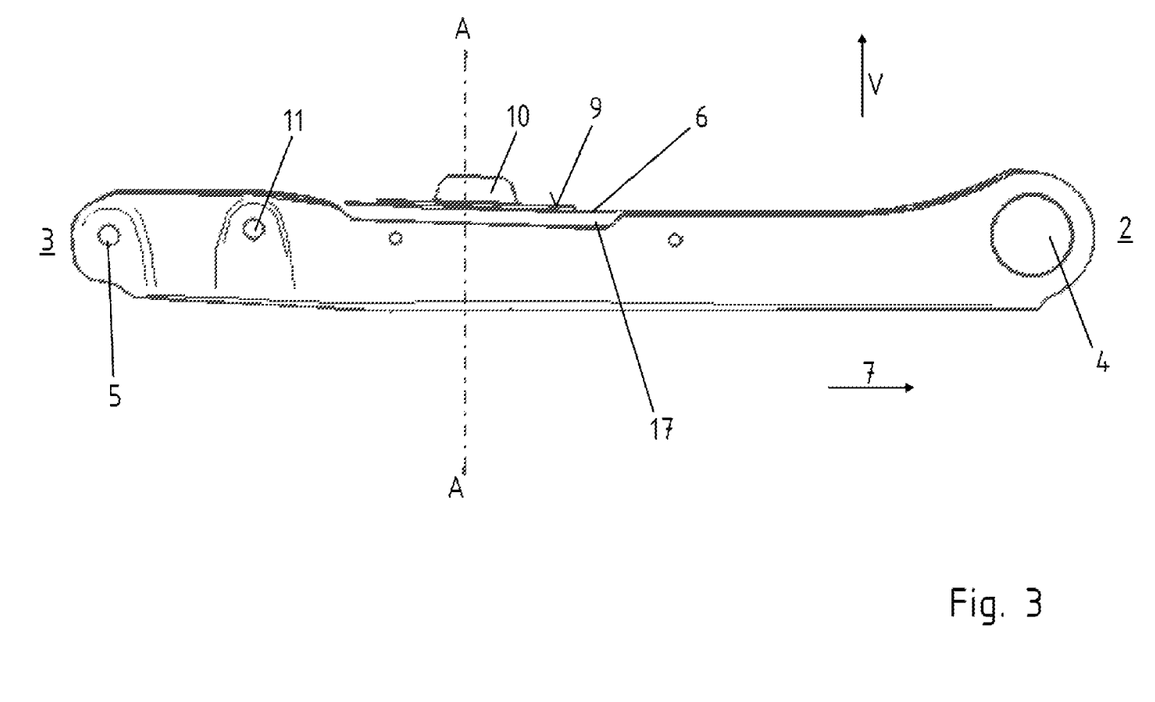
FIG. 3 shows a side view of the spring link.
Figure 4:
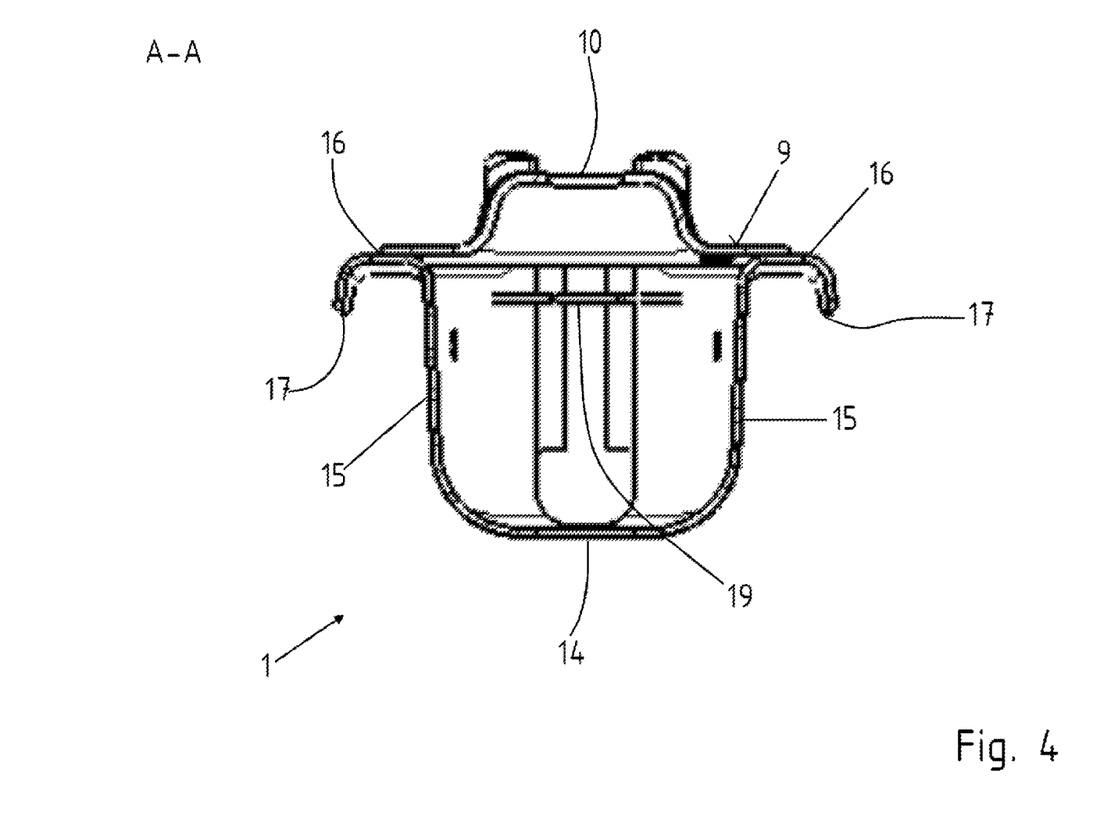
FIG. 4 shows a line of intersection A-A from FIG. 3.

Furthermore, a reinforcement plate 19 with additional stiffening is provided. This can also be readily seen in the cross-sectional view as shown in FIG. 4. It can also be seen in the side view shown in FIG. 3 that the collar 17 bent downward with respect to the vertical direction is formed only in the region of the spring seat plate 8 to afford additional bracing. Furthermore, as shown in the plan view of FIG. 5, the flange 16 is widened in the region of the spring seat plate 8, such that a thermal joining seam 20 (indicated by way of example) can be produced. Once again, the spring link is shown in a sectional view as per the line of intersection A-A from FIG. 3 in FIG. 4.

Figure 6:
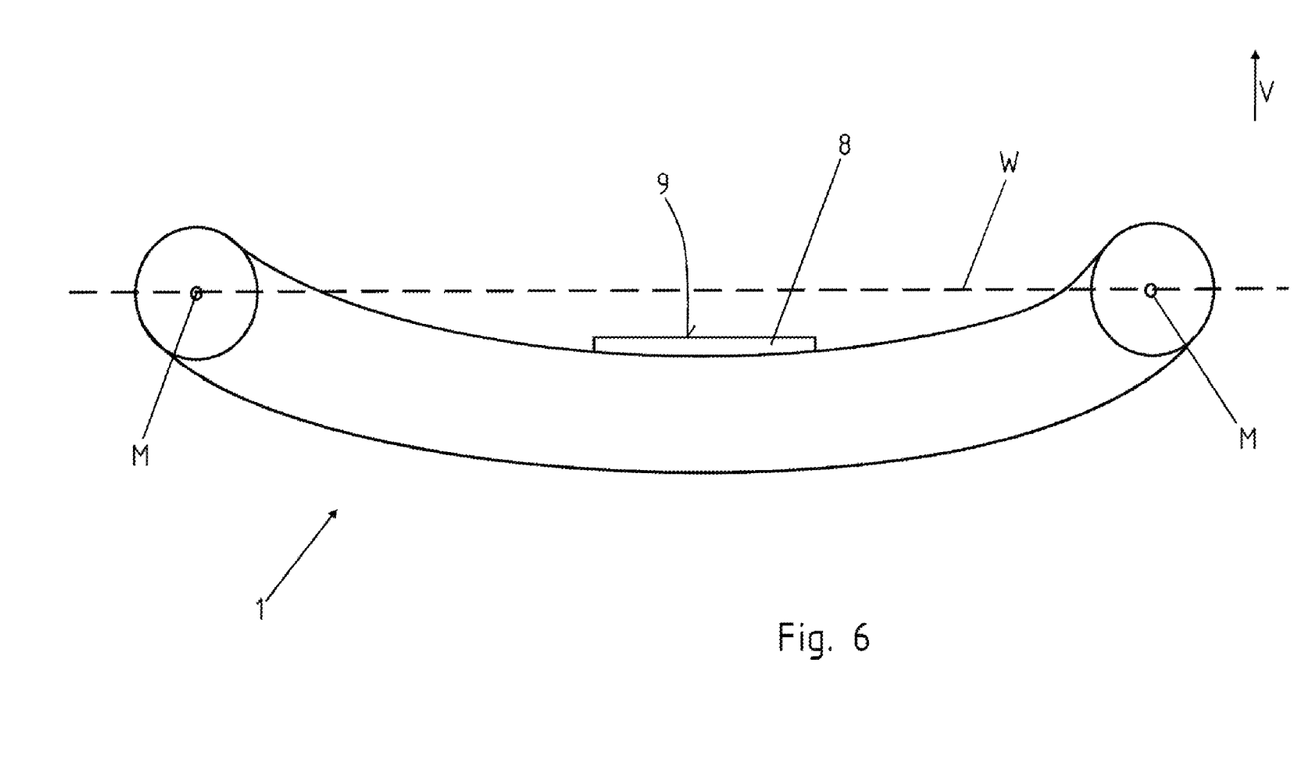
FIG. 6 shows a schematic view of a downwardly curved spring link.

FIG. 6 shows a spring link 1 according to the invention in an alternative embodiment variant. Here, a line of action W is shown through the attachment points 4, 5. Said line of action runs through the respective center points M of the attachment points 4, 5. Thus, the spring link 1 has an arched progression oriented downward with respect to the vertical direction V. This has the effect that the spring supporting surface 9 lies below the line of action W.

The invention claimed is:

1. Spring link for a motor vehicle, wherein
the spring link is produced as an elongated, deformed hollow profile of open cross section made of a steel material and has respective attachment points at longitudinal ends of the spring link,
the spring link, in an installed position, is arranged with an opening of the hollow profile pointing upward,
a spring seat plate for receiving a helical compression spring is coupled to the spring link on and/or partially in the opening,
the hollow profile, in the open cross section and the installed position, comprises:
a web,
two opposing legs extending upwardly from the web, and
in a region of the spring seat plate,
flanges protruding laterally from the legs, and
collars formed on the flanges, and
in the installed position and in the region of the spring seat plate,
the flanges protrude laterally from upper ends of the legs, and
the collars are bent downward from distal ends of the flanges toward the web.

2. Spring link according to claim 1, wherein the hollow profile is of U-shaped or C-shaped or hat-shaped configuration in cross section.

3. Spring link according to claim 1, wherein a spacing between the legs in the region of the spring seat plate is smaller than or equal to 1.2 times a spacing between the legs in a region of one of the longitudinal ends or attachment points.

4. Spring link according to claim 1, wherein a spacing between the legs in the region of the spring seat plate corresponds to 0.5 times to 1.2 times a receiving diameter on the spring seat plate, the receiving diameter configured for receiving the helical compression spring.

5. Spring link according to claim 1, wherein a spacing between the legs increases toward the opening and the legs extend at an angle in relation to one another.

6. Spring link according to claim 1, wherein a spacing between the legs is reduced in a longitudinal direction of the spring link towards one of the longitudinal ends.

7. Spring link according to claim 1, wherein
a straight connecting line through the attachment points forms a line of action, and
the hollow profile has an arched progression in relation to the line of action.

8. Spring link according to claim 7, wherein, in the installed position, the arched progression is oriented below the line of action and/or the spring seat plate comprises a spring supporting surface lying below the line of action.

9. Spring link according to claim 1, wherein
a wall thickness of the hollow profile is from 1.8 mm to 4.75 mm, and
a wall thickness of the spring seat plate is greater than or equal to the wall thickness of the hollow profile.

10. Spring link according to claim 1, wherein a reinforcement plate is coupled in and/or on the opening of the hollow profile at least in a region of one of the longitudinal ends.

11. Spring link according to claim 1, wherein the spring seat plate comprises:
a spring supporting surface, and
a bead oriented, in the installed position, upward with respect to the spring supporting surface to engage into the helical compression spring.

12. Spring link according to claim 1, wherein a spacing between the legs in the region of the spring seat plate corresponds to 0.8 times to 1.1 times a receiving diameter on the spring seat plate, the receiving diameter configured for receiving the helical compression spring.

13. Spring link according to claim 1, wherein
a straight connecting line through the attachment points forms a line of action, the hollow profile is curved away from the line of action, and in the installed position, the spring seat plate comprises a spring supporting surface lying below the line of action.

14. Spring link according to claim 13, wherein the spring seat plate comprises a bead, which in the installed position is convex upward with respect to the spring supporting surface to engage into the helical compression spring.

15. Spring link for a motor vehicle, wherein the spring link is produced as an elongated, deformed hollow profile of open cross section made of a steel material and has respective attachment points at longitudinal ends of the spring link, the spring link, in an installed position, is arranged with an opening of the hollow profile pointing upward, a spring seat plate for receiving a helical compression spring is coupled to the spring link on and/or partially in the opening, the hollow profile, in the open cross section and the installed position, comprises:
a web,
two opposing legs extending upwardly from the web, and
in a region of the spring seat plate,
flanges protruding laterally from the legs, and
collars formed on the flanges, and a spacing between the legs in the region of the spring seat plate is smaller than or equal to a spacing between the legs in a region of one of the longitudinal ends or attachment points.

16. Spring link for a motor vehicle, wherein the spring link is produced as an elongated, deformed hollow profile of open cross section made of a steel material and has respective attachment points at longitudinal ends of the spring link, the spring link, in an installed position, is arranged with an opening of the hollow profile pointing upward, a spring seat plate for receiving a helical compression spring is coupled to the spring link on and/or partially in the opening, the hollow profile, in the open cross section and the installed position, comprises:
a web,
two opposing legs extending upwardly from the web, and
in a region of the spring seat plate, collars formed on the legs, and in the installed position and in the region of the spring seat plate, the collars are bent downward toward the web.

* * * * *